US006260934B1

(12) United States Patent
Lee (10) Patent No.: US 6,260,934 B1
(45) Date of Patent: Jul. 17, 2001

(54) BRAKE CONTROL SYSTEM AND METHOD FOR PREVENTING A VEHICLE FROM ROLLING DOWNWARD ON A SLOPE

(75) Inventor: Kwang-hee Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/366,154

(22) Filed: Aug. 3, 1999

(51) Int. Cl.[7] ........................................ B60T 8/32
(52) U.S. Cl. .................... 303/192; 303/9.69; 303/22.8
(58) Field of Search .............................. 303/3, 191, 192, 303/9.69, 20, 22.1, 22.8; 188/DIG. 2, 1.11

(56) References Cited

U.S. PATENT DOCUMENTS

| 4,485,444 | * | 11/1984 | Maryama et al. ................... 364/426 |
| 4,629,043 | | 12/1986 | Matsuo et al. ....................... 192/4 A |
| 4,717,207 | * | 1/1988 | Kubota et al. ............................ 303/3 |
| 4,849,890 | * | 7/1989 | Inoue et al. ............................ 303/95 |
| 5,002,343 | * | 3/1991 | Brearly et al. ........................... 303/7 |
| 5,549,364 | * | 8/1996 | Mayr-Frohlich et al. .......... 303/9.69 |
| 6,052,644 | * | 4/2000 | Murakami et al. ................... 701/93 |

FOREIGN PATENT DOCUMENTS

| 0 812 747 A2 | 12/1997 | (EP) . |
| 0 812 747 A3 | 12/1997 | (EP) . |
| 63-188556 | 8/1988 | (JP) . |
| 95-40817 | 2/1995 | (JP) . |

\* cited by examiner

Primary Examiner—Robert J. Oberleitner
Assistant Examiner—Devon Kramer (74) Attorney, Agent, or Firm—Christie, Parker & Hale, LLP (57) ABSTRACT

The processing for controlling brake systems, which can control the release time of the brake force in consideration of the gradient degree and the load and vehicle weight when the vehicle starts after a stop, so as to prevent the vehicle from rolling backward on the slope, comprising the steps of determining if conditions of a vehicle are suitable for entering a slope start control mode; determining if air pressure in air tanks are maintained over a predetermined pressure after entering the slope start control mode, when it has been determined that the conditions of the vehicle were suitable for the slope start control mode; maintaining brake force by controlling of solenoid valves without brake pedal operation, when it has been determined that the air pressure in the air tanks were maintained over the predetermined pressure; determining if conditions of doors and transmission gear position, clutch stroke, and acceleration pedal operation are suitable for the vehicle's start, while maintaining the brake force without brake pedal operation; determining if the degree of the road gradient is within a predetermined range for the vehicle's steady start on the basis of the data detected by gradient sensor or by a driver's mode selection, when it has been determined that the various conditions were suitable for the vehicle's steady start; calculating pressure reduction rates for the air pressure in order to release the brake force on the basis of the RPM of the engine, vehicle's weight, and amount of stroke displacement applied on the clutch pedal, when it has been determined that the gradient degree is in the range for the vehicle's steady start; releasing the brake force by opening of solenoid valves according to the calculated reduced air pressure rate; and controlling ABS or ASR according to the wheel speed detected by the speed sensors, if an operation of the brake pedal is detected while the vehicle is running.

20 Claims, 8 Drawing Sheets

BRAKE CONTROL SYSTEM AND METHOD FOR PREVENTING A VEHICLE FROM ROLLING DOWNWARD ON A SLOPE

BACKGROUND OF THE INVENTION

(a) Field of the Invention

The present invention relates to a brake control system and method, in particular, to a brake control system and method for preventing a vehicle from rolling downward when starting on a slope and for providing driving stability by automatically controlling brake force when parking and stopping.

(b) Description of the Related Art

A brake system is an important safety system used to bring a vehicle to a safe controlled stop and maintain the vehicle in a stationary state. Accordingly, the brake system requires durable braking ability considering the top speed and weight of the vehicle and the brake system itself must not obstruct the rotation of wheels when it is not operating.

Brake systems are classified into mechanical brakes, hydraulic brakes, servo brakes, and air brakes according to their operating method. Among them, the air brake systems are widely used for heavy-duty vehicles such as trucks and trailers because the air brakes can obtain high brake forces using relatively low control pressure.

However, the air brake systems cannot still satisfactorily operate for the heavy-duty vehicle especially when the vehicle restarts after stopping on a slope. That is, the heavy-duty vehicle may roll downward due to the weight of the vehicle and its load when starting on the slope. To avoid the vehicle's rolling downward on the slope, drivers should push the acceleration pedal to increase engine torque. This kind of operation leads to an incomplete combustion of fuel, a decreased air/fuel ratio, and noise creation.

Therefore, a slope start auxiliary device preventing a vehicle from rolling downward on a slope has been used. Japanese Laid-Open Patent No. 95-48017 discloses a slope start auxiliary device using a 5-way control valve for maintaining front and rear wheels in a locked state. However, the 5-way control valve makes the operation of device very complex. In addition, if the control valve breaks down, brake service is not available and it is impossible to use the slope start auxiliary device.

SUMMARY OF THE INVENTION

The present invention has been made in an effort to solve the above problems of the prior art.

It is an object of the present invention to provide a brake control system which can control the release time of the brake force in consideration with the gradient degree of a slope and the load and vehicle weight when the vehicle starts on the slope, so as to prevent the vehicle from rolling downward on the slope.

It is another object of the present invention to provide a brake control system which can provide driving convenience on congested roads where stops and restarts are frequently repeated by automatic control of an auxiliary parking device without the driver's operation.

It is another object of the present invention to provide a brake control system in which a plurality of solenoid valves are used such that even though a solenoid valve is out of service, the auxiliary slope start and auxiliary-parking function can still be performed, resulting in driving safety and reliability.

Also, it is another object of the present invention to provide a brake control system which can reduce the manufacturing cost by using easily obtainable, inexpensive solenoid valves.

To achieve the above objects, the brake control system is provided with a switching signal detector for detecting signals from various switching points of the vehicle; a sensor data detector for detecting data on vehicle condition from various sensors provided in the vehicle; a gradient detector for detecting a degree of the road gradient; a load sensor for sensing a weight loaded on the road by the vehicle; a main control unit for collecting the information from all the above detecting devices, analyzing data through predetermined algorithms, and performing an overall operation of slope start control and auxiliary parking control functions; an interface part for performing an upgrade of programs and serial communication of self-analyzing data by contacting I/O devices; a plurality of solenoid valves executing the slope start control and auxiliary parking control by being adjusted according to signals from the main control unit; an indicator for indicating the operating state of the slope start control and auxiliary parking control by lighting an affected lamp according to the signals from the main control unit; and an alarm generator for generating a predetermined alarm when the vehicle rolls backward on a slope or when normal brake force is not generated in parking according to signals from the main control unit.

Also, to achieve the above objects, a full air type brake system comprising a wheel speed sensor for sensing wheel rotational speed of a front and a rear wheels of the vehicle, an ABS control unit for controlling anti-lock and anti-slip brake systems on the basis of data detected by the wheel speed sensor, and a modulator for adjusting the air pressure providing to air chambers according to signal from the ABS control unit, in accordance with the present invention are provided with a slope start control unit for integrally controlling an auxiliary slope starting and auxiliary parking functions on the basis of data of the overall vehicle conditions; a first and a second solenoid valves connected to the output of dual brake cylinder for performing the slope start function by adjusting the air pressure supplying to a release valve and a main relay valve, the solenoid valves being adjusted according to a control signal from the slope start control unit; and a third solenoid valve placed between the air tanks and the main relay valve for performing the auxiliary parking function by adjusting a post-front wheel side relay valve and a post-rear wheel side main relay valve, the third solenoid valve's duty being adjusted according to a control signal from the slope start control unit.

Also, to achieve the above objects, an air-over-hydraulic brake system comprising a speed sensor for sensing wheel rotational speed of a front and a rear wheels, a plurality of master cylinders for generating hydraulic pressure by using applied air pressure, an ABS control unit for outputting an anti-lock control signal on the basis of data detected by the speed sensor in case when the brake force is generated by the dual brake cylinder, and modulators for performing brake operation according to anti-lock control signals from the ABS control unit, in accordance with the present invention are provided with a slope start control unit for integrally controlling an auxiliary slope start and auxiliary parking functions on the basis of the data of the overall vehicle conditions; a first and second solenoid valves placed between the output of a dual brake cylinders and a relay valve for adjusting air pressure of modulators, the valves being adjusted according to the control signal from the slope start control unit; and a third solenoid valve connected between the air tanks and output side of the relay valve for adjusting the amount of air supplying according to a control signal from the slope start control unit.

The process for controlling brake systems according to the present invention comprises the steps of determining if conditions of a vehicle are suitable for entering a slope start control mode; determining if air pressure in air tanks are maintained over a predetermined pressure after entering the slope start control mode, when it has been determined that the conditions of the vehicle were suitable for the slope start control mode; maintaining brake force by controlling of solenoid valves without brake pedal operation, when it has been determined that the air pressure in the air tanks were maintained over the predetermined pressure; determining if conditions of doors and transmission gear position, clutch stroke, and acceleration pedal operation are suitable for the vehicle's start, while maintaining the brake force without brake pedal operation; determining if the degree of the gradient road is within a predetermined range for the vehicle's steady start on the basis of the data detected by gradient sensor or by a driver's mode selection, when it has been determined that the various conditions were suitable for the vehicle's steady start; calculating pressure reduction rate for the air pressure in order to release the brake force on the basis of the RPM of the engine, vehicle's weight, and amount of stroke displacement applied on the clutch pedal, when it has been determined that the gradient degree is in the range for the vehicle's steady start; releasing the brake force by opening of solenoid valves according to the calculated reduced air pressure rate; and controlling ABS or ASR according to the wheel speed detected by the speed sensors, if an operation of the brake pedal is detected while the vehicle is running.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

The preferred embodiment of the present invention will now be described in more detail with reference to the accompanying drawings.

Figure 1:
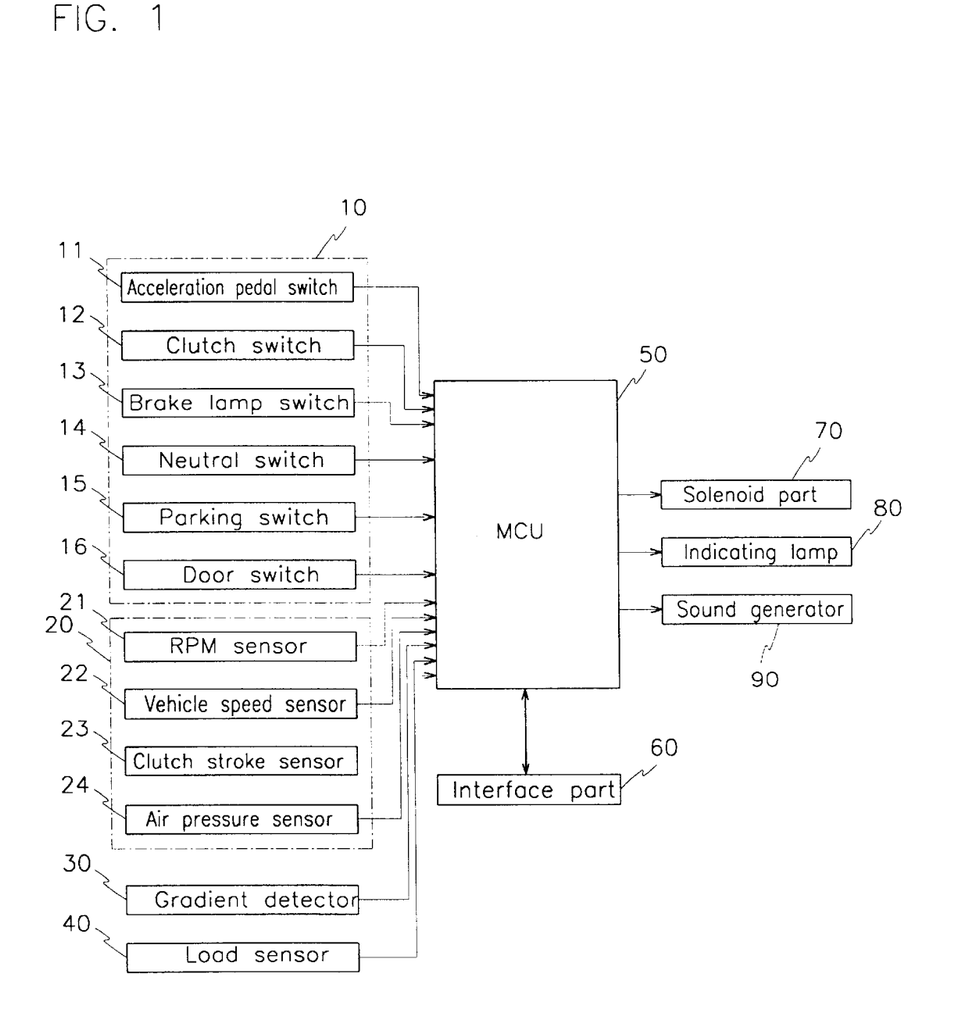
FIG. 1 is a block diagram of a brake control system according to a preferred embodiment of the present invention.

As shown in FIG. 1, the brake control system according to the present invention comprises a switching signal detector 10, a sensor data detector 20, a gradient detector 30, a load sensor 40, a main control unit (MCU) 50, an interface part 60, a solenoid part 70, an indicating lamp 80, and an alarm sound generator 90.

The switching signal detector 10 detects the switching signals from various switches provided in a vehicle and outputs a signal.

The sensor data detector 20 outputs an electric signal corresponding to the vehicle's condition information on the basis of data detected by the various sensors provided in the vehicle.

The gradient detector 30 outputs an electric signal of the gradient on the basis of data detected by a gradient sensor for detecting the gradient or a mode selection switch manually operated by a driver.

The load sensor 40 detects vehicle's load applied to a road surface and outputs a corresponding electric signal on the basis of data detected by load sensor 40.

The MCU 50 integrates the signals from the switching signal detector 10, the sensor data detector 20, the gradient detector 30, and the load sensor 40, and analyzes the same by means of a predetermined algorithm so as to perform the slope starting control and auxiliary parking control on the basis of the analyzed data.

The interface part 60 performs the upgrade of programs and serial communication of self-analyzing data by contacting I/O devices.

The solenoid valve part 70 comprises a plurality of solenoid valves for performing the slope start control and auxiliary parking control, the valves being adjusted by the MCU 50 in accordance with signals from the switching signal detector 10, the sensor data detector 20, the gradient detector 30, and the load sensor 40.

The indicating lamp 80 indicates which function is performed by lighting the corresponding lamp according to a control signal from the MCU 50.

The alarm generator 90 sounds a predetermined alarm according to a control signal from the MCU 50 when the vehicle rolls downward on a slope or when brake force can not be generated normally in parking.

The switching signal detector 10 comprises an acceleration pedal switch 11 which outputs data on the actuation of an acceleration pedal and the acceleration rate, a clutch switch 12 which outputs data on the actuation of a clutch pedal, a brake lamp switch 13 which outputs data on the operation of a brake lamp in relation with the operation of the brake pedal, a neutral switch 14 which outputs data on the position of a shift lever, a parking switch 15 which outputs data on the actuation of a the parking brake, and a door switch 16 which outputs data on the state of vehicle doors.

The sensor data detector 20 comprises an RPM sensor 21 for sensing the RPM of the engine, a vehicle speed sensor 22 for sensing vehicle speed, a clutch stroke sensor 23 for sensing stroke degree of the clutch pedal, and an air pressure sensor 24 for sensing the degree of pressure in an air tank.

As described above, the gradient detector 30 may comprise a gradient sensor for sensing a gradient of the road surface or a gradient mode selection switch by which a gradient mode can by manually selected by the driver.

When the gradient mode selection switch is used for the gradient detector 30, the predetermined modes preferably consists of low, medium, and high gradient modes according to the gradient degree.

A description will now be made of the way of controlling the brake control system according to the present invention.

When the ignition switch is turned on, the main control unit (MCU) 50 determines if the brake lamp switch 13 of the switching signal detector 10 is ON and if the parking switch 15 is OFF.

If the brake lamp switch 13 is ON and the parking switch 15 is OFF, the MCU 50 regards this as an intention to start in the slope start control mode and determines if the air pressure in an air tank, which provides brake force to a brake cylinder, is over a predetermined pressure level, for example 5 bar, on the basis of the data detected by the air pressure sensor 24 of the sensor data detector 20.

If the air pressure is over the predetermined pressure level, the MCU 50 operates the solenoid valves so as to maintain the brake force without the pushing of the brake pedal as an auxiliary parking operation.

When each wheel is locked by the auxiliary parking operation, the MCU 50 determines on the basis of the data from the switching signal detector 10 if the door switch 16 is switched OFF indicating all doors are closed, the neutral switch 14 indicates one of the transmission gears is selected, the clutch switch 12 is switched ON indicating the transmission of engine torque, and the acceleration pedal switch 11 is switched ON indicating the increasing amount of intake air.

If any one of the switches of the switching signal detector 10 does not satisfy the above conditions, the MCU 50 regards this as a dangerous condition for vehicle start and causes the alarm generator 90 to sound an alarm. If all the switches of the switching signal detector 10 satisfy the above conditions, the MCU 50 regards this as a starting intention, then determines the degree of the road gradient on the basis of data detected or selected by the gradient detector 30.

When the gradient mode selection switch is used as the gradient detector 30, the degree of gradient is decided by the driver's selection.

If the degree of the slope gradient is out of a predetermined range of ±30°, the MCU 50 regards this as dangerous for vehicle's start and has the alarm generator 90 sound an alarm, the indicating lamp 80 indicate the danger, and consequently, the brake force released slowly.

On the other hand, if the degree of the slope gradient is within the predetermined range of ±30°, the MCU 50 regards this as a starting intention, then analyzes the increasing rate of the RPM detected by the RPM sensor 21, the amount of the clutch stroke displacement detected by the clutch stroke sensor 23, and vehicle's weight detected by the load sensor 40, and consequently computes the pressurized air release rate for releasing the brake force.

After determining the pressurized air release rate, the MCU 50 opens the corresponding solenoid valve according to the pressurized air release rate so as to release the brake force. Accordingly, the vehicle can start on the slope.

In this embodiment, the pressurized air release rate according to the degree of the slope gradient, the clutch stroke length, and the RPM of the engine is set as shown in the following Table 1.

TABLE 1

| Gradient Mode | Gradient rate (%) | Length of clutch stroke | Engine RPM | air pressure release rate (cm³/sec) |
|---|---|---|---|---|
| Normal | 0~3 | 35 | IDLE | 40 |
| Low | 3~5 | 35 | IDLE | 40 |
| Medium | 5~8 | 38 | 700 | 30 |
| High | 8~30 | 40 | 1200 | 20 |

Regarding the interface part 60, if an I/O device is connected to the interface part 60, the MCU 50 enters a communication mode for CAN communication with the I/O device so as to be able to upgrade and debug the operation program of MCU 50 and display diagnosis data and running information if a data analysis is required.

Figure 2:
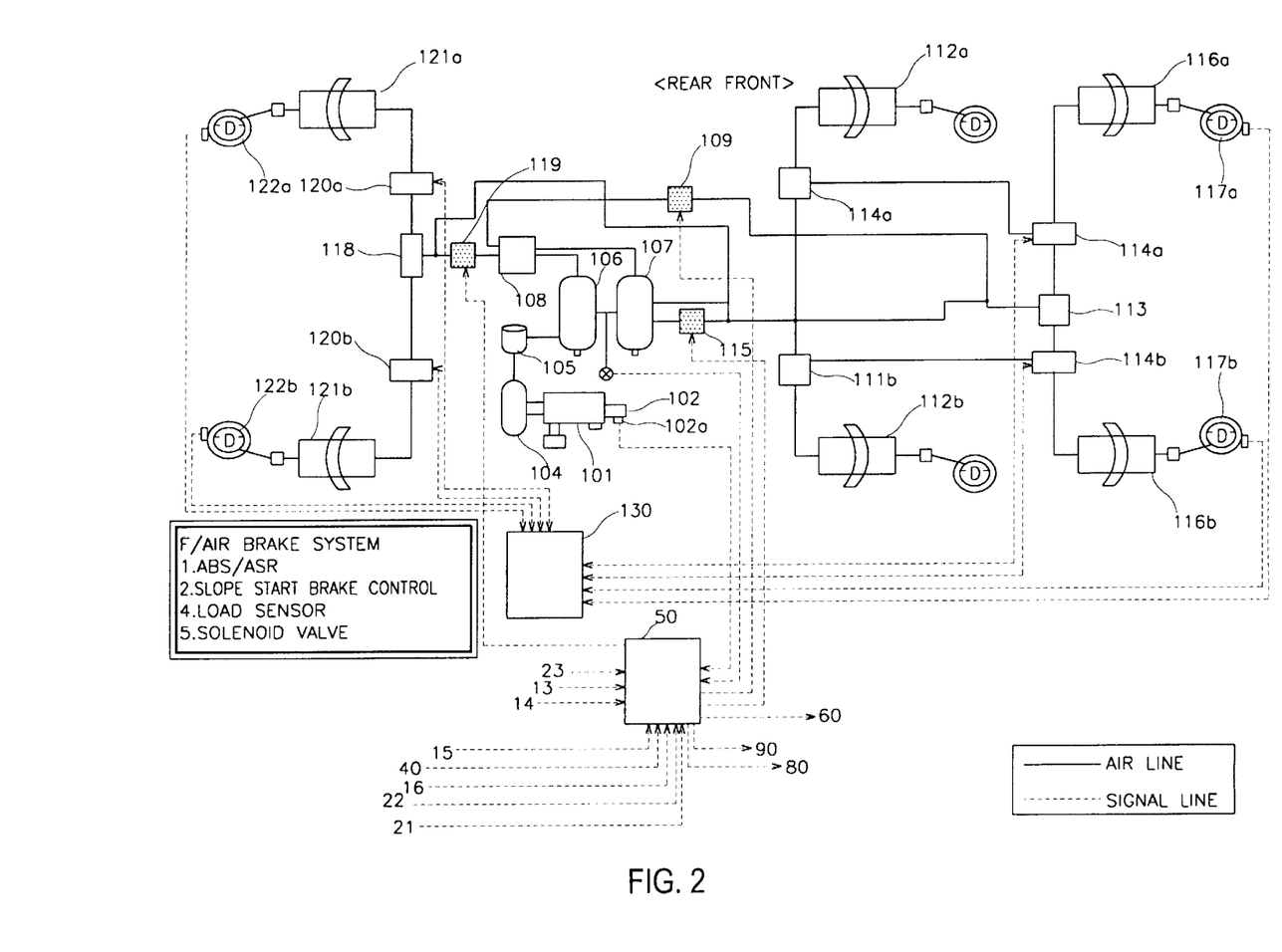
FIG. 2 is a schematic diagram of a full air brake system employing a brake control system according to a preferred embodiment of the present invention.

FIG. 2 shows a first embodiment of the present invention, in which the above described brake control system is applied to a full air brake system.

A full air brake system comprises an engine 101 for generating a torque, a transmission 102 connected to the engine 101, a vehicle speed sensor 102a provided to a driven gear part of the transmission 102 for sensing vehicle speed, an air compressor 104 connected to the engine 101 for generating air pressure, a dryer 105 for drying and filtering the air from the air compressor 104, and front and rear air tanks 106 and 107 for storing the air from the dryer 105 in compressed state. The full air brake system further comprises a dual brake cylinder 108 for generating brake force, first and second solenoid valves 119 and 109 that are connected to the output of the dual brake cylinder 108 and whose opening and closing times are regulated for auxiliary slope start, a release valve 118 connected to the first solenoid valve 119, modulators 120a and 120b for adjusting the air pressure from the release valve 118 and transmitting the pressurized air to air chambers 121a and 121b of the front wheels, a main release valve 113 connected to the second solenoid valve 109, modulators 114a and 114b for providing the pressurized air from the second solenoid valve 109 to air chambers 116a and 116b of the rear wheels, a third solenoid valve 115 connected to another output of the air tank 107 and which controls air supply for generating brake force according to a control signal from the MCU 50 described in FIG. 1, wheel speed sensors 122a, 122b, 117a, and 117b for sensing wheel speed of the front and rear wheels, and an Anti-Lock Brake system (ABS) control unit 130 for controlling anti-lock and anti-slip operation on the basis of data detected by the wheel speed sensors 122a, 122b, 117a, and 117b. The MCU 50 controlling the slope start and the auxiliary parking operations on the basis of data detected by various switches and sensors of the vehicle as described with reference to FIG. 1.

Figure 3A:
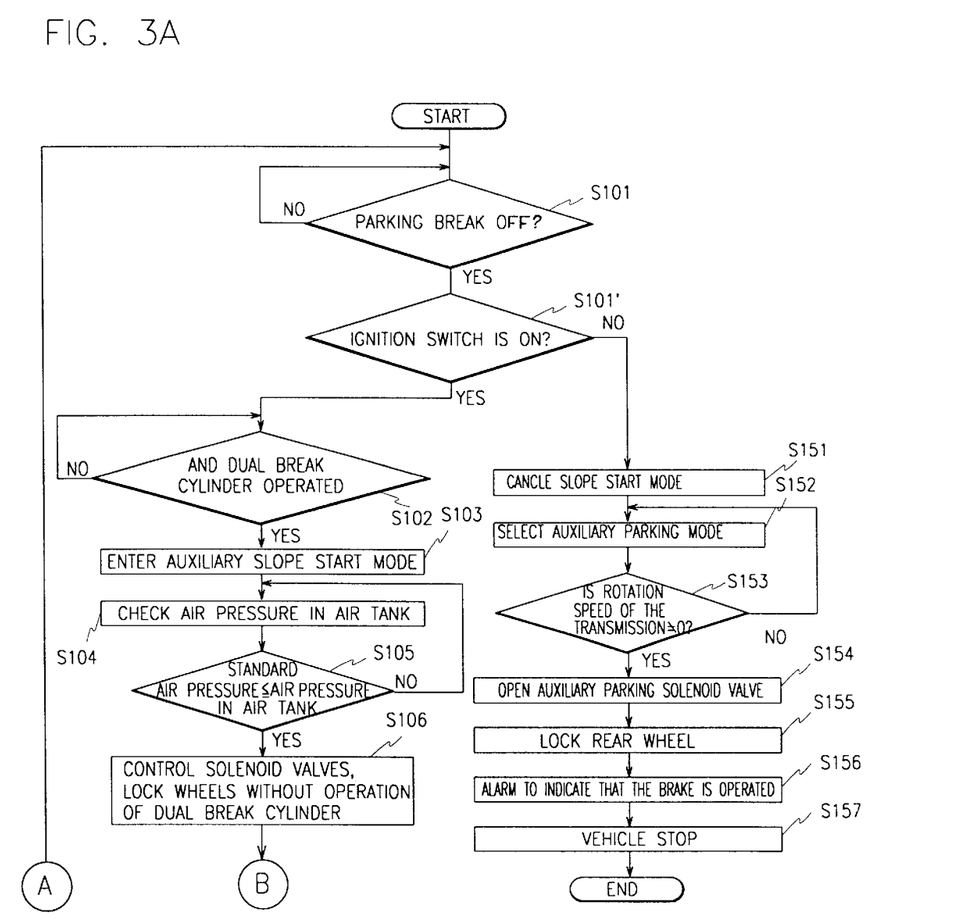
FIG. 3 is a flowchart showing an operation procedure of the brake control system applied to the full air brake system depicted in FIG. 2.
Figure 3B:
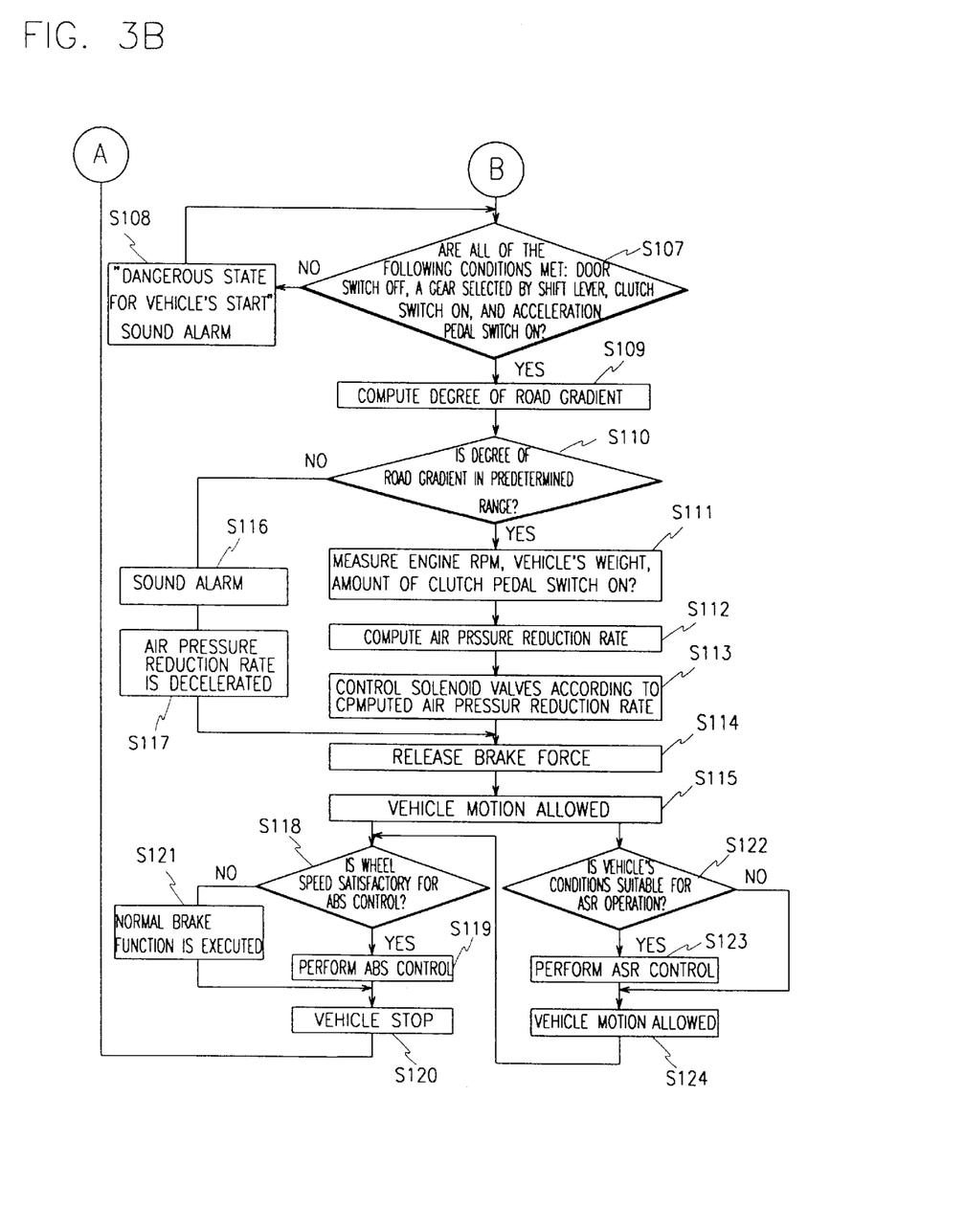

The slope start and the auxiliary parking control processing of the full air brake system will now be described with reference to FIGS. 2 and 3.

At step 101, the MCU first determines if a parking switch 15 is off, and if yes, then determines if the ignition switch is on at step 101'. When the ignition switch is on, the engine 101 is started, and the compressor 104 connected to the engine 101 is operated to generate pressurized air and the generated pressurized air in the compressor 104 is dried and filtered by the dryer 105, and consequently accumulated in the air tanks 106 and 107 for the front and the rear wheels. At the same time, the RPM sensor 21 detects the rotation speed of the engine 101 and sends an electric signal to the MCU 50. Then at step S102, the MCU 50 determines if the dual brake cylinder 108 is operated, that is, the MCU 50 determines if the vehicle is ready for starting.

If the vehicle is ready to start, at step S103 the MCU 50 enters the auxiliary slope start mode at step 104, and computes the air pressure in the air tanks 106 and 107 of the front and the rear wheels on the basis of data detected by the pressure sensor 150 at step S104. It is at step S105, where it is determined if the pressure in the air tank is over a predetermined standard pressure, for example 5 Bar. When the air pressures are over the predetermined standard pressure, then the program proceeds to step S106 at which the MCU 50 actuates the first, second, and third solenoid valves 119, 109, and 115 so as to assist the vehicle's slope start.

That is, the first and the second solenoid valves 110 and 109 are actuated to close positions according to the control signals from the MCU 50, and the third solenoid valve 115 is actuated to an open position to provide the air to the release valve 118 and the main release valve 113 so that the brake force on the front wheels is maintained by the actuation of the modulators 120a and 120b and the brake force on the rear wheels is maintained by the actuation of the modulators 114a and 114b. Accordingly, the wheels are locked without the operation of the dual brake cylinder 108.

On the other hand, in step 105, when the air pressures are under the predetermined standard pressure, then the program returns to step S104 at which the air pressure is continuously checked.

When the wheels are locked without the operation of the dual brake cylinder 108, the MCU 50 determines at step S107 if the doors are closed on the basis of the signal from the door switch 16, if the shifting lever has selected a gear on the basis of the signal from the neutral switch 14, if the clutch has been applied for transmitting the engine torque on the basis of the signal from the clutch switch 12, and if the acceleration pedal has been pushed on the basis of the signal from the acceleration pedal switch 11.

If any one of the conditions at step S107 is not satisfied, the program proceeds to step S108 at which the buzzer sounds an alarm, and then returns to step S107 at which all the above conditions are continuously checked.

On the other hand, if all conditions are satisfied, the program proceeds to step S109 at which the MCU 50 computes the degree of the road gradient on the basis of the data from the gradient detector 30.

Then, at step S110, the MCU 50 determines if the degree of the road gradient is in a predetermined range, for example within ±30°, where the steady slope start is possible. When the degree of the road gradient is in the predetermined range, then the program proceeds to step S111 at which the MCU 50 measures the RPM of the engine 101 on the basis of the data from the RPM sensor 21; the vehicle's whole weight on the basis of the data from the load sensor 40, and the amount of clutch pedal displacement on the basis of the data from the clutch stroke sensor 23, and consequently, computes an air pressure reduction rate for unlocking the brakes at step S112 on the basis of the computed results.

After the air pressure reduction rate is determined, the MCU 50 controls the first, second, and third solenoid valves 119, 109, and 115 such that the first and the second solenoid valves 119 and 109 are opened and the third solenoid valve 115 is closed at step S113 in accordance with the air pressure reduction rate. Accordingly, the brake forces on the wheels are released at step S114 so that the vehicle is ready for a steady slope start at step S115.

On the other hand, in step 110, when the degree of the road gradient is within the predetermined range, then the program proceeds to step 116 at which the buzzer sounds an alarm and the air pressure reduction rate is decelerated at step S117. Accordingly, the vehicle is prepared for steady slope start at step S115.

While the vehicle is running at predetermined speed, if a brake force is generated by the dual brake cylinder 108, the ABS control unit 130 computes the wheel speed on the basis of the data detected by the wheel speed sensor and determines if the wheel speed is satisfactory for the ABS control at step S118.

When the wheel speed is satisfactory for the ABS control, the program proceeds to step S119 at which the ABS control unit 130 controls the front and rear modulators 120a, 120b, 114a, and 114b so as to perform the ABS control. Accordingly, the vehicle is guided to stop at step S120.

On the other hand, in step 180 when the wheel speed is not satisfactory for the ABS control, then the program proceeds to step S121 at which normal brake function is executed without ABS control and the vehicle is guided to stop at the next step S120.

In the system where only the mode selection switch 32 is provided without gradient sensor 40, the MCU 50 determines the degree of the road gradient on the basis of the data detected by the gradient detector 30, by which a gradient mode is detected or selected by the driver.

If a mode is decided, the MCU 50 enters the selected mode and then measures the weight of the vehicle and is ready for starting.

When the vehicle is ready to start, the MCU 50 controls the time for which the brake force is released by adjusting the first, second, and third solenoid valves 119, 109, and 115 according to the engine RPM, the vehicle's weight, the amount of the clutch pedal displacement, and the selected mode so as to maintain the steady start of the vehicle.

Also, in the case that both the gradient detector 30 is not provided, at step S106 where the air pressure in the air tank 106 and 107 is maintained over the predetermined degree so that the wheels are locked, the MCU 50 determines if the vehicle is ready to start on the basis of the data of the state of the doors, position of the transmission gears, the amount of the clutch pedal displacement, and the position of the acceleration pedal.

Once the vehicle starts, the MCU 50 computes the air release rate and then controls the first, second, and third solenoid valves 119, 109, and 115 on the basis of computed values so as to unlock the brakes for vehicle's steady slope start.

In addition, At step S101', when the ignition switch is off the MCU 50 cancels the selection of the slope start mode, and selects the auxiliary parking mode at step S152.

Once the auxiliary parking mode is selected, the MCU 50 determines at step S153 if the rotation speed of the transmission detected by the speed sensor 102a remains "0."

If the rotation speed of the transmission is "0," the MCU 50 sends a control signal to the second solenoid valve 109 such that the second solenoid valve 109 is opened. Accordingly, a brake force is generated for locking the rear wheels at step S155. Consequently, at step S156, the MCU 50 activates the buzzer alarm to indicate that the brake is operated.

In the above description on this preferred embodiment, the MCU 50 and the ABS control unit 130 are explained as separate elements, but they may be integrated as one body element such as an integral ECU.

Figure 5A:
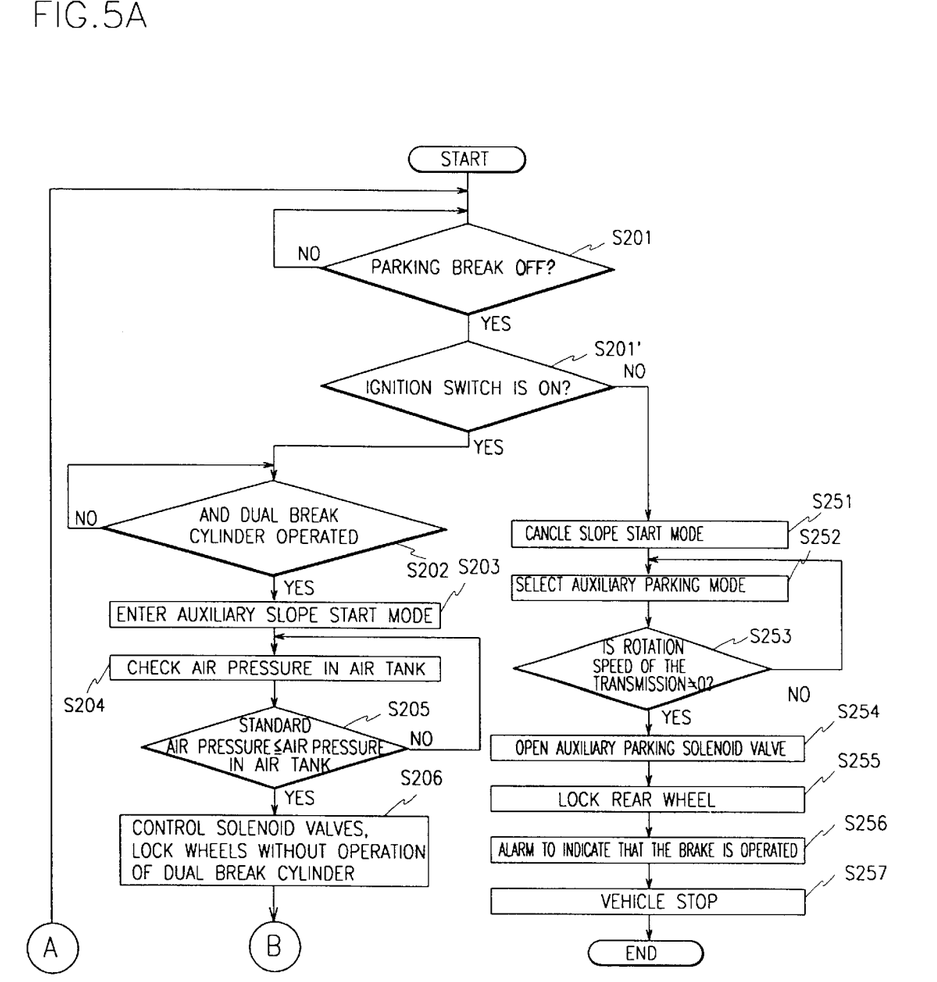
FIG. 5 is a flowchart showing an operation procedure of the brake control system applied to the air over brake system depicted in FIG. 4.
Figure 5B:
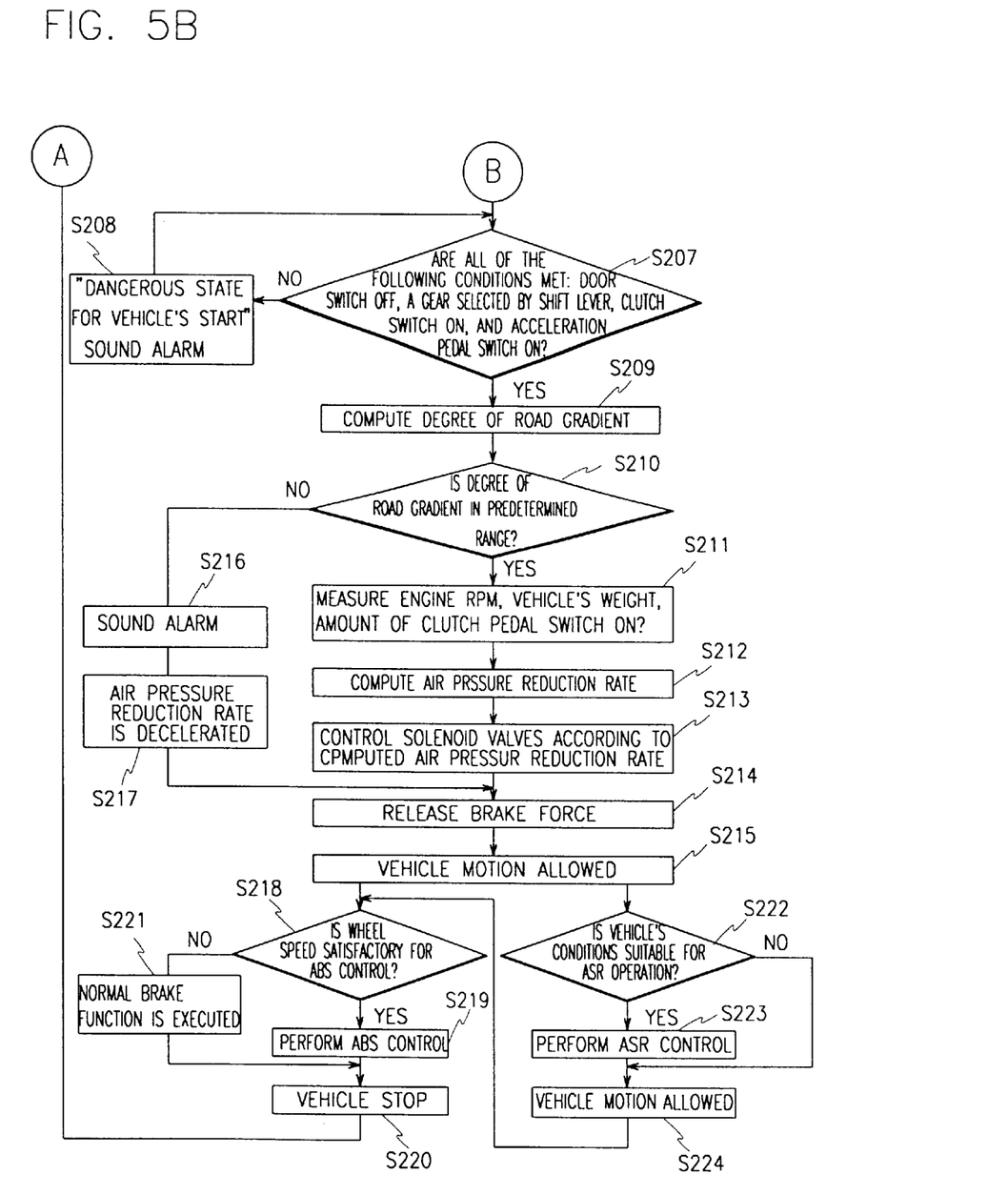

FIG. 5 shows an air over hydraulic brake system in which the brake control system of the present invention is applied.

Air over hydraulic brakes generate brake force with air pressure which is transmitted to the brakes via a hydraulic medium.

Figure 4:
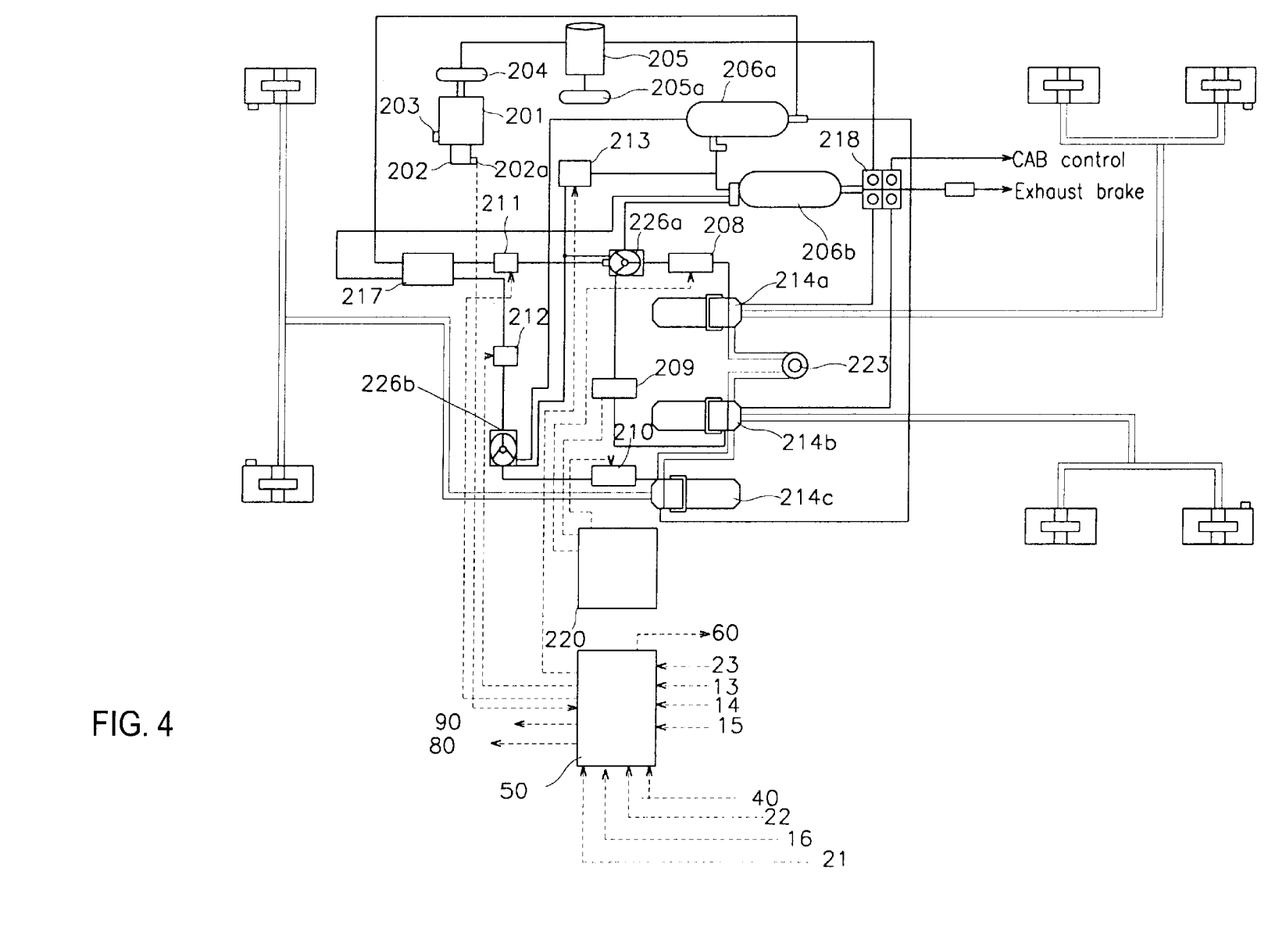
FIG. 4 is a schematic diagram of an air over brake system where a brake control system according to a preferred embodiment of the present invention is employed.

The air over hydraulic brake system comprises an engine 201 for generating a torque, a transmission 202 connected to the engine 201, a compressor 204 connected to the engine 201 for generating air pressure. The air over hydraulic brake system further comprises a dryer 205 for drying and filtering the air from the air compressor 204, a purge tank 205a for adjusting the air amount by purging the pressurized air accumulated in the dryer 205, a projection valve 218 for guiding the air from the dryer 205, a plurality of air tanks 206a and 206b for accumulating the air from the projection valve 218, a dual brake cylinder 217 for generating a brake force, a plurality of master cylinders 214a, 214b, and 214c for generating hydraulic pressure using the pressurized air, a reservoir 223 for maintaining the air amount and the air pressure supplied to the master cylinders 214a, 214b, and 214c, an ABS control unit 220 for outputting the brake control signal according to the wheel speed detected by the speed sensor 22 when a brake force is generated by the dual brake cylinder 217, modulators 208, 209, and 210 for performing brake control according to the anti-lock control signal from the ABS control unit 220, relay valves 226a and 226b for controlling the air flow to the modulators 208, 209 and 210, a first and a second solenoid valves 211 and 212 provided between the relay valves 226a and 226b and the dual brake cylinder 217 for preventing the vehicle from rolling downward on a slope starting by adjusting the relay valves' on/off action according to the control signal from the MCU 50, and a third solenoid valve 213 provided between the air tanks 206a and 206b and the relay valves 216a and 216b for performing the auxiliary parking control by controlling the air amount to the relay valves 226a and 226b according to the control signal to the MCU 50.

The slope starting control procedure of the air over hydraulic brake will now be described with reference to FIG. 5.

At step 101, the MCU first determines if the parking switch is off, and if yes, then determines if the ignition switch is on at step 101'. When the ignition switch is on, the engine 201 is started, and the compressor 204 connected to the engine 201 is operated to generate air pressure and the air generated in the compressor 204 is dried and filtered by the dryer 205, and consequently accumulated in the air tanks 206a and 206b.

At the same time, the RPM sensor 21 detects the rotation speed of the engine 201 and sends an electric signal to the MCU 50.

The MCU 50 at step S202 then determines if the dual brake cylinder 217 is being operated and if the parking switch is off, that is, the MCU 50 determines if the vehicle is ready for starting. If the vehicle is ready for starting, the MCU 50 enters the slope start control mode and measures the air pressure in the air tanks 206a and 206b at step S204. Then, at step S205, the MCU 50 determines if the pressure in the air tanks 206a and 206b is over a predetermined standard pressure, for example 5 bar. When the result of this determination indicates that the air pressure is over the predetermined standard pressure, then at step S206 the MCU 50 controls the first, second, and third solenoid valves 211, 212, and 213 for the vehicle's steady slope start. That is, the first and second solenoid valves 211 and 212 are controlled to be closed and the third solenoid valve is controlled to be opened according to the control signals so that the pressurized air in the air tank is transmitted to the modulators 208, 209 and 210, and the master cylinder 214a through the relay valves 226a and 226b. Accordingly, the wheels are locked without pushing the brake pedal.

On the other hand, in step 25, when the air pressures are under the predetermined standard pressure, then the program returns to step S204 at which the air pressure is continuously checked.

Once the wheels have been locked, the MCU 50 at step S207 determines if the doors are closed on the basis of the signal from the door switch, if the shifting lever has selected a gear on the basis of the signal from the neutral switch, if engine torque transmission is ready on the basis of the signal from the clutch switch, and if the acceleration pedal has been pushed on the basis of the signal from the acceleration pedal switch.

If any one of the conditions at step S207 is not satisfied, the program proceeds to step S208 at which the buzzer sounds an alarm, and then returns to step S207 at which all the above conditions are continuously checked.

On the other hand, if all the conditions at step S207 are satisfied, the program proceeds to step S209 at which the MCU 50 computes the degree of the road gradient on the basis of the data from the gradient detector 30.

Then, at step S210, the MCU 50 determines if the degree of the road gradient is in a predetermined range, for example within ±30°, where the steady slope start is possible. When the degree of the road gradient is in the predetermined range, then the program proceeds to step S211 at which the slope start control unit 230 computes the RPM of the engine 201 on the basis of the data detected by the RPM sensor 20, the weight of the vehicle on the basis of the data detected by the load sensor 40, and the amount of clutch pedal displacement on the basis of the data detected by the clutch stroke sensor 23, and consequently, computes an air pressure reduction rate for releasing the brakes at step S212 on the basis of the computed results. After the computation of the air pressure reduction rate is completed, the MCU 50 controls the first, second, and third solenoid valves 211, 212, and 213 such that the first and the second solenoid valves 211 and 212 are opened and the third solenoid valve 213 at step S213 is closed in accordance with the air pressure reduction rate. Accordingly, the brake force on the wheels are released at step S214 so that the vehicle is ready for steady slope start at step S215.

On the other hand, when the degree of the road gradient is not within the predetermined range, then the program proceeds to step S216 at which the buzzer sounds an alarm, and then the air pressure reduction rate is decelerated at step S217. Accordingly, the vehicle is prepared for steady slope start at step S215.

While the vehicle is running at predetermined speed, if a brake force is generated by the dual brake cylinder 217, the ABS control unit 220 computes the wheel speed on the basis of the data detected by the wheel speed sensor and determines if the wheel speed is satisfactory for the ABS control at step S218.

When the wheel speed is satisfactory for the ABS control, the program proceeds to step S219 at which the ABS control unit 220 controls the modulators 208 and 209 so as to perform the ABS control. Accordingly, the vehicle is guided to stop at step S220.

On the other hand, when the wheel speed is not satisfactory for the ABS control, then the program proceeds to step S221 at which normal brake function is executed without ABS control and the vehicle is guided to stop at step S220.

In the system where only the mode selection switch is used as the gradient detector 30, the MCU 50 determines the degree of the slope on the basis of the data detected by the mode selection switch with which a gradient mode is selected by the driver.

If a mode is decided, the MCU 50 enters the selected mode and then computes the weight of the vehicle and is ready for starting.

When the vehicle was ready to start, the MCU 50 controls the time for which the brake force is released by adjusting the first, second, and third solenoid valves 211, 212, and 213 according to the PPM, the vehicle's weight, the amount of the clutch pedal displacement, and the selected mode of the mode selection switch so as to maintain the steady start of the vehicle.

Also, in the case that both the gradient sensor and the mode selection switch are not provided, at step S206 where the air pressure in the air tank 206a and 206b is maintained over the predetermined degree so that the wheels are locked, the MCU 50 determines if the vehicle is ready to start on the basis of the data of the state of the doors, the position of the transmission gears, the amount of the clutch pedal displacement, and the position of the acceleration pedal.

Once the vehicle starts, the MCU 50 computes the air release rate and then controls the first, second, and third solenoid valves 211, 212, and 213 on the basis of computed values so as to unlock the brakes for vehicle's steady slope start.

At step S250, when the engine is not running, the main switch remains on, and the parking brake is applied, the program proceeds to step S251 at which the MCU 50 determines that the vehicle will be parked so as to cancel the selection of the slope start control mode, and select the auxiliary parking mode at step S252.

Once the auxiliary parking mode is selected, the MCU 50 determines at step S253 if the rotation speed of the transmission detected by the vehicle speed sensor 22 remains "0."

If the rotation speed of the transmission is "0," the MCU 50 controls the third solenoid valve 210 to an open state. Accordingly, a brake force is generated for locking the rear wheels at step S255. Consequently, at step S256, the MCU 50 activates the buzzer alarm to indicate that the brake is operated.

In the above description, the MCU 50 and the ABS control unit 220 are explained as separate element, but they can be integrated as one body element such as an integral ECU.

The input/output conditions of the MCU 50 for each above mentioned state of the vehicle will now be described with reference to FIG. 6.

Figure 6:
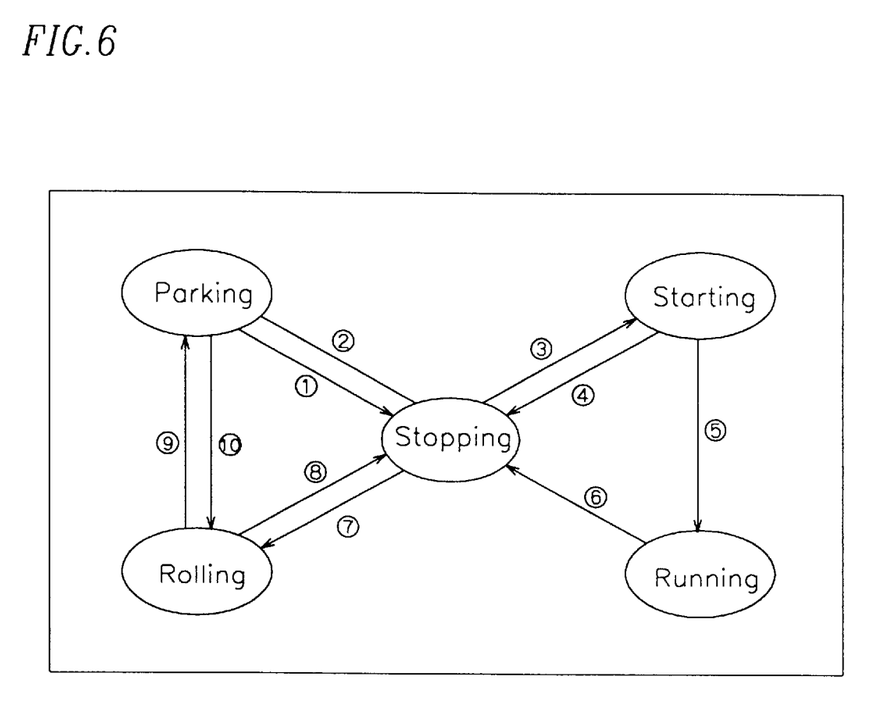
FIG. 6 is a diagram showing the input/output conditions at each control mode of the brake control system according to the present invention.

As shown in FIG. 6, if the ignition switch is on, the parking brake is not applied, and the brake pedal is being pushed, the slope start control unit regards this as phase (1) in which the parking state of the vehicle has changed to the stop state, so as to perform brake control by actuating the solenoid valves. On the other hand, if that the ignition switch is off, the parking brake is applied, and the brake pedal is not being pushed, the slope start control unit judges this as phase (2) in which the stop state of the vehicle has changed into the parking state, so as to perform the auxiliary parking operation by actuating the solenoid valves.

If the brake pedal is not being pushed, the clutch pedal indicates a state for transmitting engine torque, the acceleration pedal is being pushed, and the gear shift lever has selected the first speed gear or reverse gear, the MCU 50 regards this as phase (3) in which the stop state of the vehicle has changed into the start state so that the MCU 50 performs the slope start control for starting the vehicle by actuating the solenoid valves. On the other hand, if the brake pedal is being pushed, the clutch pedal indicates a state for transmitting engine torque, and the acceleration pedal is not being operated, the MCU 50 judges this as phase (4) in which the starting state of the vehicle has changed into the stop state so that the MCU 50 performs a braking procedure by actuating the solenoid valves.

If the acceleration pedal is applied, the vehicle's speed is over "0," and the gear shift lever has selected any of the transmission gears, the MCU 50 judges this as phase (5) in which the vehicle has started and is running so that the MCU 50 does not perform any action.

If the brake pedal is pushed, the clutch pedal is operated, and the vehicle's speed is decelerated swiftly, the MCU 50 regards this as phase (6) in which the running state of the vehicle is being changed into the stop state so that the ABS control is performed.

If the ignition switch is on, the brake pedal is not actuated, and the vehicle's speed is over "0," the MCU 50 regards this as phase (7) in which the vehicle is rolling downward after stopping, so that the MCU 50 performs the slope start control by actuating the solenoid valves and sounding the buzzer alarm. On the other hand, if the ignition switch is on, and the vehicle's speed is "0," the MCU 50 regards this as phase (8) in which the vehicle is maintaining at the stop state so that the MCU 50 performs brake function for preventing the vehicle from rolling downward by actuating the solenoid valves. If the ignition switch is off, and the vehicle's speed is over "0", the MCU 50 unit regards this as phase (9) in which the vehicle rolls back in the parking state so that the MCU 50 performs brake function for preventing the vehicle from rolling downward by actuating the solenoid valves and sounding the buzzer alarm.

If the ignition switch is off and the vehicle's speed is "0," the MCU 50 regards this as phase (10) in which the MCU 50 performs auxiliary parking function by actuating the solenoid valves. On the other hand, if the ignition switch is off, the MCU 50 regards this as phase (11), (12) in which the vehicle is in the parking state so that that the MCU performs the auxiliary parking function.

As described above, the slope start control system according to the present invention automatically controls the release time and speed of the brake force on the basis of the data of the degree of the road gradient to drive, the vehicle's weight, and the strokes of the acceleration pedal and the clutch pedal so that the slope start control system provides the vehicle with starting stability on a slope as well as parking stability by the generating of auxiliary brake force.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A brake control system for a vehicle comprising:
   switching signal detecting means for detecting signals from a plurality of switches provided in the vehicle;
   sensor data collecting means for collecting data from a plurality of sensors provided in the vehicle;
   gradient detecting means for detecting a road gradient;
   load detecting means for detecting a load applied to the road surface by the vehicle;
   a main control unit for collecting data from the switching signal detecting means, the gradient detecting means, and the load detecting means, analyzing the data through a predetermined algorithm, and performing overall slope start control and auxiliary parking control operations;
   interface means for performing an upgrade of computer programs and serial communication of self-analyzing data by contacting I/O devices;
   a plurality of solenoid valves executing the slope start and auxiliary parking control, the solenoid valves being adjusted according to signals from the main control unit;

indicating means responsive to signals from the main control unit, wherein the indicating means displays when the main control unit is performing the slope start control and auxiliary parking control operations; and alarm means for sounding a predetermined alarm in conditions where the vehicle rolls backward on a slope or a brake can not generate a normal brake force in parking.

2. A brake control system according to claim 1, wherein the gradient detecting means comprises a gradient sensor for sensing a degree of road gradient.

3. A brake control system for a vehicle, the system comprising:

switching signal detecting means for detecting signals from a plurality of switches provided in the vehicle, the switching signal detecting means comprising,
an acceleration pedal switch which outputs data as to whether or not an acceleration pedal is operated,
a clutch switch which outputs data informing if a clutch pedal is operated,
a brake lamp switch which outputs data as to whether or not a brake lamp is lighted,
a neutral switch which outputs data as to whether or not a transmission is in neutral,
a parking switch which outputs data as to whether or not a parking brake is operated, and
a door switch which outputs data as to whether or not doors are closed;

sensor data collecting means for collecting data from a plurality of sensors provided in the vehicle;

gradient detecting means for detecting a road gradient;

load detecting means for detecting a load applied to the road surface by the vehicle; and a main control unit for collecting data from the switching signal detecting means, the gradient detecting means, and the load detecting means, analyzing the data through a predetermined algorithm, and performing overall slope start control and auxiliary parking control operations.

4. A brake control system for a vehicle, the system comprising:

switching signal detecting means for detecting signals from a plurality of switches provided in the vehicle;

sensor data collecting means for collecting data from a plurality of sensors provided in the vehicle, comprising,
an RPM sensor for sensing engine RPM,
a speed sensor for sensing speed of a vehicle,
a clutch stroke sensor for sensing an amount of stroke displacement applied on a clutch pedal, and
an air pressure sensor for sensing a degree of pressure in an air tank;

gradient detecting means for detecting a road gradient;

load detecting means for detecting a load applied to the road surface by the vehicle; and a main control unit for collecting data from the switching signal detecting means, the gradient detecting means, and the load detecting means, analyzing the data through a predetermined algorithm, and performing overall slope start control and auxiliary parking control operations.

5. The brake control system of claim 4, wherein the main control unit determines a release rate and a release time of brake force by means of solenoid valves according to the weight of the vehicle, the degree of the road gradient, degree to which an acceleration pedal is activated, and amount of stroke displacement of the clutch pedal.

6. The brake control system of claim 4, wherein the main control unit determines the release rate and release time of the brake force according to the gradient detected by the gradient detecting means, the degree to which an acceleration pedal is activated, and an amount of stroke displacement of the clutch pedal.

7. The brake control system of claim 4, wherein the main control unit determines a release rate and a release time of the brake force according to the amount of stroke displacement applied on the clutch pedal and the RPM of the engine regardless of the degree of the road gradient.

8. A brake control system for a vehicle, the system comprising:

switching signal detecting means for detecting signals from a plurality of switches provided in the vehicle;

sensor data collecting means for collecting data from a plurality of sensors provided in the vehicle;

gradient detecting means for detecting a road gradient, wherein the gradient detecting means comprises a mode selection switch for driver selection of predetermined gradient levels;

load detecting means for detecting a load applied to the road surface by the vehicle; and a main control unit for collecting data from the switching signal detecting means, the gradient detecting means, and the load detecting means, analyzing the data through a predetermined algorithm, and performing overall slope start control and auxiliary parking control operations.

9. A brake control system of claim 6, wherein the mode selection switch comprises a plurality of modes and each mode is predetermined with parameters of the degree of gradient, a length of the clutch stroke, engine RPM, and a brake air pressure release rate as follows:

| Gradient Mode | Gradient (%) | Length of stroke (mm) | RPM (rev/min) | Release rate of air pressure |
| --- | --- | --- | --- | --- |
| Normal | 0~3 | 35 | IDLE | 40 |
| Low | 3~5 | 35 | IDLE | 40 |
| Medium | 5~8 | 38 | 700 | 30 |
| High | 8~30 | 40 | 1200 | 20 |

10. A vehicle of full air type brake system comprising wheel speed sensors for sensing front and rear wheels' rotational speed of the vehicle, Anti-lock Brake System (ABS) control unit for controlling anti-lock and anti-slip brake systems after analyzing a rotation speed of each wheel detected by the wheel speed sensor, and a modulator controlling air pressure provided from an air chamber according to signals from the ABS control unit, wherein the brake system further comprises:

a slope start control unit for integrally controlling an auxiliary slope start function and auxiliary parking function after analyzing data of vehicle conditions;

a first and a second solenoid valves connected to an output of a dual brake cylinder for executing the slope start control by adjusting the air pressure transmitted to main relay valves according to a control signal from the slope start control unit; and a third solenoid valve placed between an air tank and the main relay valves for executing the auxiliary parking control by adjusting a post front wheel side relay valve and a post rear wheel side main relay valve according to a control signal from the slope start control unit.

11. A vehicle air-over-hydraulic brake system comprising a speed sensor mounted on front and rear wheels for detecting a wheel rotational speed, a plurality of master cylinders for maintaining hydraulic pressure by air pressure, an ABS control unit which outputs an anti-lock control signal according to the wheel speed detected by the speed sensor while the brake force is generated by a dual brake cylinder, and modulators executing brake control according to the anti-lock controlling signal from the ABS control unit, wherein the brake system further comprises:
  a slope start control unit for integrally controlling an auxiliary slope start function and auxiliary parking function after analyzing various data on vehicle conditions;
  a first and second solenoid valves provided between an output of a dual brake cylinder and a relay valve for controlling the brake force by adjusting pressure of the modulator according to the control signal from the slope start control unit;
  a third solenoid valve connected between an air tank and output side of the relay valve for adjusting the amount of air being provided to the relay valve according to a control signal from the slope start control unit.

12. The brake control system of claim 11, wherein the ABS control unit and slope start control unit are integrated with an electric control unit which performs ABS control and slope start control.

13. A method for controlling a brake system comprising the steps of:
  determining if conditions of a vehicle are suitable for entering a slope start control mode;
  determining if air pressure in an air tank is maintained over a predetermined pressure when the conditions of the vehicle are suitable for the slope start control mode;
  maintaining a brake force without brake pedal operation by adjusting solenoid valves when the air pressure in the air tank is over a predetermined pressure;
  determining if conditions of doors, transmission gear position, clutch stroke and acceleration pedal actuation are suitable for start while the brake force is being maintained without the brake pedal operation;
  determining if a degree of a road gradient is in a predetermined range for vehicle's steady start;
  computing air pressure reducing rate for releasing the brake force according to an RPM of the engine, vehicle's weight and amount of stroke displacement applied on a clutch pedal when the degree of gradient is in the predetermined range for the vehicle's steady starting;
  releasing the brake force by opening solenoid valves according to the computed air pressure reducing rate; and
  controlling ABS or Anti-Slip Regulator (ASR) according to a wheel rotation speed detected by a speed sensor when an operation of the brake pedal is detected while the vehicle is operating.

14. The method of claim 13, further comprising the steps of:
  determining if the vehicle's speed is caused by the vehicle's movement after releasing the slope start control mode, when an ignition key is off and a parking brake is operated; and
  generating parking brake force at a rear wheel brake by operating an auxiliary parking solenoid valve, when the vehicle's speed is due to such vehicle movement.

15. The method of claim 13, wherein the predetermined pressure in the air tank is established at 5 BAR.

16. The method of claim 13, wherein the gradient degree range for the vehicle's slope start control starting is ±30°.

17. The method of claim 13, further comprising of the step of sounding an alarm if the gradient detected by a gradient sensor or mode selection switch is out of the range for slope start control starting of the vehicle.

18. A brake control system for a vehicle, the system comprising:
  a switching signal detector for detecting signals from a plurality of vehicle switches;
  a sensor data collector for collecting data from a plurality of sensors provided in the vehicle;
  a gradient detector for detecting a road gradient;
  a load detector for detecting a load applied to the road surface by the vehicle;
  a main control unit for collecting the data from the switching signal detector, the gradient detector, and the load detector, analyzing the data through a predetermined algorithm, performing slope start control and auxiliary parking control operations, and outputting signals to a plurality of solenoid valves;
  an indicator responsive to signals from the main control unit, wherein the indicator indicates whether the slope start control and auxiliary parking control operations are being performed; and
  an alarm for sounding an alarm during the occurrence of selected predetermined vehicle conditions.

19. An air brake system for a vehicle, the system comprising:
  at least one air tank for supplying air pressure to the air brake system;
  at least one front air chamber for applying air pressure to at least one front brake, and at least one rear air chamber for applying air pressure to at least one rear brake;
  at least one front modulator for controlling the air pressure provided to the front air chambers, and at least one rear modulator for controlling the air pressure provided to the rear air chambers;
  a dual brake cylinder connected in a pneumatic circuit with the air tanks and the front and rear air chambers;
  at least one front release valve, and at least one rear release valve connected via the pneumatic circuit between the dual brake cylinder and the front and rear air chambers respectively;
  a first solenoid valve connected via the pneumatic circuit with the dual brake cylinder and the front release valve;
  a second solenoid valve connected via the pneumatic circuit with the dual brake cylinder and the rear release valve;
  wheel speed sensors for sensing a rotational speed for each of the vehicle's front and rear wheels;
  an anti-lock brake system (ABS) control unit for controlling anti-lock and anti-slip brake systems after analyzing the rotational speed of each wheel as detected by the wheel speed sensors;
  the front and rear modulators being responsive to signals from the ABS control unit for regulating air pressure to the respective front and rear air chambers;
  a slope start control unit for integrally controlling an auxiliary slope start function and auxiliary parking function after analyzing data from a plurality of sensors provided on the vehicle;
  the first and second solenoid valves executing the slope start control function by adjusting the air pressure transmitted to the front and rear release valves, according to a control signal from the slope start control unit; and a third solenoid valve connected, via the pneumatic circuit, with the air tank and the front and rear release valves for executing the auxiliary parking control by adjusting the front and rear release valves according to a control signal from the slope start control unit.

20. An air-over-hydraulic brake system for a plurality of brakes on a vehicle, the system comprising:

at least one air tank for supplying air pressure to the air-over-hydraulic brake system;

a plurality of master cylinders for connection via a hydraulic circuit with a plurality of brakes;

a dual brake cylinder for connection via a pneumatic circuit with each of the master cylinders, the dual brake cylinder receiving air pressure from the air tank and providing air pressure to each master cylinder, wherein each master cylinder generates hydraulic pressure for actuation of at least one of the brakes;

at least one wheel speed sensor for sensing a rotational speed of at least one of the vehicle's wheels;

an anti-lock brake system (ABS) control unit for controlling anti-lock and anti-slip brake systems after analyzing the rotational speed of a wheel as detected by the wheel speed sensors while braking force is generated by the dual brake cylinder, wherein the ABS system outputs an anti-lock control signal;

a plurality of modulators for executing brake control, each modulator being connected via the pneumatic circuit with the air tank and one of the master cylinders via a relay valve, wherein the modulator affects brake control by modulating air pressure to a corresponding master cylinder according to the anti-lock control signal from the ABS control unit;

a slope start control unit for integrally controlling an auxiliary slope start function and auxiliary parking function after analyzing data from a plurality of sensors provided on the vehicle;

first and second solenoid valves connected via the pneumatic circuit between an output of the dual brake cylinder and the relay valve, wherein in response to the control signal from the slope start control unit, the solenoid valves control braking force by adjusting air pressure to the modulators;

a third solenoid valve connected via the pneumatic circuit between the air tank and output side of the relay valve for adjusting the amount of air being provided to the relay valve according to a control signal from the slope start control unit.

* * * * *